United States Patent Office 3,157,634
Patented Nov. 17, 1964

3,157,634
GLUCOFURANOSIDES AND PROCESS FOR THEIR PREPARATION
Jean Druey, Riehen, and Georg Leo Huber, Allschwil, Switzerland, assignors to Ciba Corporation, a corporation of Delaware
No Drawing. Filed Dec. 30, 1959, Ser. No. 862,799
Claims priority, application Switzerland, Jan. 10, 1959, 68,170; Nov. 6, 1959, 80,318; Nov. 30, 1959, 81,247
26 Claims. (Cl. 260—210)

The present invention relates to the manufacture of glucofuranosides of the formula

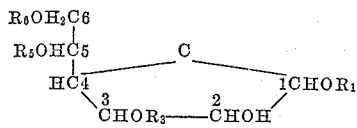

in which $R_1$, $R_3$, $R_5$ and $R_6$ stand for the organic radicals of alcohols and $R_3$, $R_5$ and $R_6$ may also stand for acyl radicals of aromatic or heterocyclic carboxylic acids, and the 2-O-substituted derivatives of these compounds.

Substituents in the 2-position are unsubstituted or substituted hydrocarbon radicals, such as substituted or unsubstituted aliphatic, alicyclic, alicyclic-alphatic, araliphatic or heterocyclic-aliphatic hydrocarbon radicals, or acyl radicals, such as especially those of aliphatic carboxylic acids, for example fatty acids, such as carbonic acid, formic acid, acetic acid, propionic acid, butyric acid or of higher alkane- or alkene-carboxylic acids, alicyclic carboxylic acids, such as cyclopentyl-carboxylic acid, alicyclic-aliphatic carboxylic acids araliphatic or aromatic carboxylic acids, for example phenylacetic acids or benzoic acids in which the phenyl radicals may be substituted, for example by lower alkoxy, alkyl or trifluoromethyl groups or halogen atoms, heterocyclic carboxylic acids, or of organic sulfonic acids, especially of benzenesulfonic acids, such as toluenesulfonic acids.

The invention relates more especially to compounds of the formula shown above and their 2-O-substituted derivatives such as those given above, in which $R_1$, $R_3$, $R_5$ and $R_6$ are substituted or unsubstituted aliphatic, alicyclic, alicyclic-aliphatic, araliphatic or carbocyclic-aromatic hydrocarbon or heterocyclyl-aliphatic radicals, or $R_3$, $R_5$ and $R_6$ may also represent acyl radicals or substituted or unsubstituted carbocyclic aromatic or heterocyclic carboxylic acids.

Aliphatic hydrocarbon radicals $R_1$, $R_3$, $R_5$ and $R_6$ and in 2-position are more especially lower alkyl radicals, such as methyl, ethyl, propyl, or butyl, lower alkenyl radicals, for example allyl or lower alkinyl radicals, for instance propinyl. As substituents of these radicals there come into consideration more especially free or substituted amino, hydroxyl or mercapto groups, for example lower mono- or di-alkyl, alkenyl, cycloalkyl, cycloalkenyl amino groups, alkylene-amino, oxa- or aza-alkyleneamino groups, such as dimethylamino diethylamino, pyrrolidino, piperidino morpholino or piperazine groups, alkoxy or alkylmercapto groups, such as methoxy or ethoxy, free or functionally converted carboxyl groups, for example lower carbalkoxy, carbamyl or nitrile groups, or halogen atoms, such as chlorine, bromine or fluorine. Alicyclic hydrocarbon radicals $R_1$, $R_3$, $R_5$, $R_6$ and in 2-position are more especially cycloalkyl or cycloalkenyl radicals, such as cyclopentyl, cyclohexyl, cyclopentenyl or cyclohexenyl which may be substituted, for example, by a lower alkyl radical. As alicyclic aliphatic hydrocarbon radicals in the positions named there may be mentioned more particularly cycloalkyl or cycloalkenyl-alkyl radicals, e.g. cyclopentyl-methyl. Araliphatic hydrocarbon radicals in 1-, 2-, 3-, 5- and 6-position are especially phenylalkyl or phenylalkenyl radicals, such as benzyl or phenylethyl radicals.

As substituents of the aryl radicals there come into consideration especially lower alkoxy such as methoxy, ethoxy or propoxy or methylene-dioxy groups, halogen atoms, such as chlorine or bromine, alkyl radicals, such as methyl, ethyl, propyl or butyl or trifluoromethyl radicals. Carbocyclic aromatic hydrocarbon radicals $R_1$, $R_3$, $R_5$ and $R_6$ are above all phenyl radicals, which may be substituted as stated above. As heterocyclyl-aliphatic radicals in 1-, 2-, 3, 5- and 6-position there may be especially mentioned mononuclear heterocyclic alcohols, such as thienyl, furyl or pyridyl-carbinols, e.g. thenyl or furfuryl alcohol.

The acyl radicals $R_3$, $R_5$ and $R_6$ are derived more especially from benzoic acids which may be substituted, for example, in the same way as the aromatic radicals mentioned above, or from mononuclear heterocyclic carboxylic acids, such as pyridine, thiophene, furane, pyrrole, pyrazole, pyridazine, pyrazine or pyrimidine carboxylic acids, for example pyridine-2-, 3- or 4-carboxylic acid.

The new compounds have valuable pharmacological and biological properties. They increase the resistance of animal organisms to bacterial and virus infections and enhance the therapeutic effect of chemotherapeutics, for example sulfonamides, in infections. They can therefore be used alone or in combination with other medicaments, such as sulfonamides, for prophylaxis or therapy in infections. In addition, they have an antiendotoxin activity. They inhibit anaphylactic shock and inflammatory processes. They can consequently be used as medicaments.

Finally, the new compounds are also valuable intermediates. They can be converted into O-unsubstituted glucofuranosides, for example by hydrolysis of hydrogenolysis, by elimination of the radicals $R_3$, $R_5$, $R_6$ and the radicals in the 2-position.

Especially valuable in view of the above pharmacological or biological effects are the compounds of the given formula and their 2-O-acyl or substituted or unsubstituted alkyl derivatives, for example of the type stated, in which $R_1$, $R_3$, $R_5$ and $R_6$ represent lower alkyl radicals, such as methyl, ethyl, propyl, butyl, lower alkenyl radicals, for example allyl, cycloalkyl radicals, such as cyclopentyl or cyclohexyl, unsubstituted benzyl radicals or benzyl radicals substituted as shown above, or $R_3$, $R_5$ and $R_6$ may, though less advantageously also represent unsubstituted benzoyl radicals or benzoyl radicals substituted as shown above.

Of this group the lower alkyl-3:5:6-benzyl-D-glucofuranosides, particularly the methyl-3:5:6-tribenzyl-D-glucofuranoside and the ethyl-3:5:6-tribenzyl-D-glucofuranoside, are outstanding.

The new compounds are surprisingly obtained by etherifying a glucofuranose whose hydroxyl groups in the 1- and 2-positions are substituted by a methylidene group, preferably the isopropylidene group, and those in the 3-, 5- and 6-positions are substituted by the radicals $R_3$, $R_5$ and $R_6$, with an alcohol in the presence of an acid.

It could not be foreseen that the reaction would take the desired course, since it was known that 1:2-isopropylidene-3:5:6-triacetyl-glucofuranose cannot be etherified to form the corresponding glucofuranoside with an alcohol in the presence of an acid, but that in this reaction the O-unsubstituted glucopyranoside is formed.

Etherification is carried out in the manner customary in sugar chemistry, Lewis acids, such as hydrochloric acid, sulfuric acid, glacial acetic acid, if desired in admixture with hydrochloric acid, toluenesulfonic acid or salts having the character of a Lewis acid, being used as acids.

The resulting 2-unsubstituted compounds can be substituted in the 2-position in the customary manner, for example with a reactive ester of an alcohol, such as alkanol, with a strong inorganic or organic acid, such as hydrochloric acid, sulfuric acid or a benzenesulfonic acid, or with an acid halide or anhydride, preferably in the presence of an acid-binding condensing agent, such as a tertiary base, sodium acetate and the like.

The starting materials are known or can be obtained by methods known per se. They may also be formed under the reaction conditions.

The invention also encompasses those modifications of the process in which an intermediate product obtainable at any stage of the process is used as starting material and the remaining steps are carried out, or in which the process is discontinued at any stage.

When the new compounds contain basic or acid group, for example amino or carboxyl groups, salts may be prepared therefrom. Free bases can be converted, for example, into their salts with acids, particularly those which form therapeutically useful salts, such as hydrohalic acids, sulfuric acid, phosphoric acid, nitric acid, perchloric acid; aliphatic, alicyclic, aromatic or heterocyclic carboxylic or sulfonic acids, such as formic, acetic, propionic, oxalic, succinic, glycolic, lactic, malic, tartaric, citric, ascorbic, hydroxymaleic dihydroxymaleic or pyruvic acids; phenylacetic, benzoic, para-aminobenzoic, anthranilic, parahydroxybenzoic, salicylic or para-aminosalicylic acid; methanesulfonic, ethanesulfonic, hydroxyethanesulfonic, ethylenesulfonic acid; toluenesulfonic, naphthalenesulfonic acids or sulfanilic acid. Free acids can be converted, for example into metal salts, such as alkali metal or alkaline earth metal salts or ammonium salts. The salts can be converted into the free bases in the customary manner.

The new compounds or their salts can be used as medicaments, for example in the form of pharmaceutical preparations which contain them in admixture with a pharmaceutical, organic or inorganic, solid or liquid carrier suitable for enteral, parenteral or topical administration. To make up these preparations such substances are concerned as do not react with the new compound, such as for example water, gelatin, lactose, starches, magnesium stearate, talc, vegetable oil, benzyl alcohols, gums, polyalkylene glycols or other known carriers. The pharmaceutical preparations can be for example in the form of tablets, dragees, or in liquid form as solutions, suspensions or emulsions. They may also be sterilized and/or contain auxiliary substances, such as preserving, stabilizing, wetting or emulsifying agents, salts for regulating the osmotic pressure or buffers. They may also contain other therapeutically useful substances. The preparations are obtained by customary methods.

The following examples illustrate the invention:

*Example 1*

4.9 grams of 3:5:6-tribenzyl-1:2-isopropylidene-glucofuranose are kept overnight at room temperature with 100 cc. of N-methanolic hydrochloric acid. Evaporation under vacuum at below 50° C. is then carried out and the residue taken up in 150 cc. of chloroform. The chloroform solution is thoroughly washed with sodium bicarbonate solution, dried with calcined sodium sulfate and evaporated under vacuum. The oily residue is now distilled under vacuum with a free flame. In this manner there is obtained the methyl-3:5:6-tribenzyl-D-glucofuranoside of B.P. 270–275° C. under 1 mm. pressure and $[\alpha]_D^{22}$ in chloroform=+5°.

The glucofuranose used as starting material is obtained as follows:

8.8 grams of 1:2-isopropylidene-D-glucofuranose and 50.6 grams of benzyl chloride are treated with a total of 28 grams of potassium hydroxide in portions with cooling and stirring. The mixture is then stirred for 3 hours at 80–90° C. Working up from chloroform solution and distillation at 250–260° C. under 0.1 mm. pressure give 8.9 grams of 1:2-isopropylidene-3:5:6-tribenzyl-D-glucofuranose ($[\alpha]_D^{22}$ in chloroform=−28°).

*Example 2*

9.8 grams of 3:5:6-tribenzyl-1:2-isopropylidene-glucofuranose are kept overnight at room temperature with 200 cc. of N-ethanolic hydrochloric acid. The mixture is then worked up as described in Example 1. Ethyl-3:5:6-tribenzyl-D-glucofuranoside results of B.P. 270–280° C. under 1.2 mm. pressure and $[\alpha]_D^{26}$ in chloroform =+8°.

*Example 3*

5.33 grams of 3:5:6-tribenzoyl-1:2-isopropylidene-glucofuranose are shaken for ½ hour with 30 cc. of saturated methanolic hydrochloric acid and 30 cc. of glacial acetic acid. The mixture is worked up as in Example 1. There is thus obtained the methyl-3:5:6-tribenzoyl-D-glucofuranoside of B.P. 230–240° C. under 2 mm. pressure and $[\alpha]_D^{24}$ in pyridine=−36°, as an oil which solidifies on standing.

*Example 4*

5.33 grams of 3:5:6-tribenzoyl-1:2-isopropylidene-glucofuranose are shaken for ½ hour with 30 cc. of saturated ethanolic hydrohchloric acid and 30 cc. of glacial acetic acid. The mixture is worked up as in Example 1. There is thus obtained the ethyl-3:5:6-tribenzoyl-D-glucofuranoside of B.P. 310–310° C. under 2.1 mm. pressure and $[\alpha]_D^{27}$ in pyridine=−34°

*Example 5*

5.1 grams of methyl-3:5:6-tribenzoyl-D-glucofuranoside are kept for one day at room temperature with 2.3 grams of mesyl chloride in 20 cc. of pyridine. A chloroform extract of the mixture is chromatographed on a neutral aluminum oxide column (activity II). There is thus obtained a product of M.P. 50–53° C. and $[\alpha]_D^{22}$ in chloroform=−68° and a product of M.P. 58–60° C. and $[\alpha]_D^{22}$=+22°. Both products possess the empirical formula $C_{29}H_{28}O_{11}S$ of methyl-3:5:6-tribenzoyl-2-mesyl-D-glucofuranoside.

*Example 6*

5.1 grams of methyl-3:5:6-tribenzoyl-D-glucofuranoside and 2.3 cc. of benzoyl chloride are kept for 1 day at room temperature in 50 cc. of pyridine. Working up is then carried out as in Example 1. There is thus obtained the methyl-2:3:5:6-tetrabenzoyl-D-glucofuranoside of B.P. 280–290° C., under 0.03 mm. pressure and $[\alpha]_D^{25}$ in chloroform=−2°.

*Example 7*

9.8 grams of 3:5:6-tribenzyl-1:2-isopropylidene-D-glucofuranose are shaken for 24 hours in 200 cc. of N-propanolic hydrochloric acid. The mixture is then evaporated under reduced pressure and the residue taken up in chloroform. The chloroform solution is washed with saturated sodium bicarbonate solution and dried with sodium sulfate. The chloroform is removed in a waterjet vacuum and the residue distilled in a high vacuum. There is obtained propyl-3:5:6-tribenzyl-pD-glucofuranoside as an oil boiling at 270–280° C. under 0.2 mm. of pressure.

*Example 8*

4.78 grams of ethyl-3:5:6-tribenzyl-D-glucofuranoside are kept for 24 hours at room temperature in 10 cc. of pyridine with 4.7 cc. of acetic acid anhydride. The mixture is worked up with the use of ether and yields ethyl-3:5:6-tribenzyl-2-acetyl-D-glucofuranoside as an oil.

*Example 9*

10.5 grams of 3:5:6-trimethyl-1:2-isopropylidene-D-glucofuranose are shaken overnight with 105 cc. of N-ethanolic hydrochloric acid. The mixture is then evaporated under reduced pressure and the product purified by extraction with chloroform and distillation in a high vacuum. There is obtained ethyl-3:5:6-trimethyl-D-glucofuranoside in the form of a thinly liquid oil boiling at 98–105° C. under 0.05 mm. of pressure; optical rotation $[\alpha]_D^{23}$=+3.0° (in chloroform). By fractional distillation a fraction with enriched α-form ($[\alpha]_D^{29}$=38.2° in chloroform) and β-form ($[α]_D^{29} = -7.7°$ in chloroform) is obtained.

The starting material is obtained as follows:

127.8 cc. of 9.4 N-sodium hydroxide solution are added dropwise with stirring to 33 grams of monoacetone glucose, 120 cc. of carbon tetrachloride and 57 cc. of dimethyl sulfate. The temperature rises in the course of one hour from 26° to 60° C. The carbon tetrachloride is then distilled off. 127.8 cc. of 9.4 N-sodium hydroxide solution are then added and 57 cc. of dimethyl sulfate are added dropwise in the course of one hour with stirring. The mixture is heated at 80 to 90° C. for 45 minutes with stirring; extraction is carried out with chloroform, the chloroform removed under reduced pressure and the residue methylated once more in the last-mentioned manner. Isolation of the reaction product by extraction with chloroform and distillation in a high vacuum yield 29 grams of 3:5:5-trimethyl-1:2-isopropylidene-D-glucofuranose boiling at 102° C.–110° C. under 0.03 mm. of pressure.

*Example 10*

9.8 grams of 3:5:6 - tribenzyl - 1:2 - isopropylidene-D-glucofuranose are shaken for 24 hours with 200 cc. of N-benzylalcoholic hydrochloric acid. The mixture is worked up as described in Example 7. There is obtained 1:3:5:6-tetrabenzyl-D-glucofuranoside in the form of an oil boiling at 250–260° C. under 0.2 mm. of pressure.

*Example 11*

9.8 grams of 3:5:6 - tribenzyl - 1:2 - isopropylidene-D-glucofuranose are shaken for 24 hours with 200 cc. of N-cyclohexanolic hydrochloric acid and the reaction product worked up as described in Example 7. There is obtained cyclohexyl-3:5:6-tribenzyl-D-glucofuranoside in the form of an oil boiling at 240–260° C. under 0.4 mm. of pressure.

*Example 12*

6.8 grams of 3:5:6 - triallyl - 1:2 - isopropylidene - D-glucofuranose are shaken for 24 hours with 200 cc. of N-ethanolic hydrochloric acid. After working up in the manner described in Example 7, there is obtained ethyl-3:5:6-triallyl - D - glucofuranoside as a thinly liquid oil boiling at 180–190° C. under 0.66 mm. of pressure.

The starting material is obtained as follows:

25.1 cc. of allyl bromide are added dropwise to 11 grams of monoacetone glucose, 50 cc. of dioxane and 16.8 grams of potassium hydroxide. The mixture is then stirred for 1½ hours at 90° C., cooled and 25.1 cc. of allyl bromide are again added, 16.8 grams of potassium hydroxide are added in portions and the mixture stirred for 2 hours at 80 to 90° C. Isolation by extraction with chloroform and distillation in a high vacuum yield 10.8 grams of 3:5:6 - triallyl-1:2-isopropylidene-D-glucofuranose as a thinly liquid oil boiling at 165–180° C. under 0.4 mm. of pressure.

*Example 13*

9.8 grams of 3:5:6-tribenzyl-1:2-isopropylidine-D-glucofuranose are shaken for 24 hours with 200 cc. of a solution of N-hydrochloric acid in ethylene glycol. After working up in the same manner as described in Example 7 there is obtained hydroxyethyl-3:5:6-tribenzyl-D-glucofuranoside as an oil boiling at 240–260° C. under 0.1 mm. of pressure.

*Example 14*

13.6 grams of 3:5:6 - triallyl - 1:2-isopropylidene - D-glucofuranose are shaken for 24 hours with 400 cc. of a solution of hydrochloric acid in ethylene glycol. After working up in the manner described in Example 7 there is obtained hydroxyethyl - 3:5:6 - triallyl-D-glucofuranoside as a thinly liquid oil boiling at 190–205° C. under 0.04 mm. of pressure.

*Example 15*

12.8 grams of 9.4 N-aqueous sodium hydroxide solution are added to 3.28 grams of ethyl-3:5:6-triallyl-D-glucofuranoside; 5.7 cc. of dimethyl sulfate are then added dropwise in the course of 2 hours at 80–90° C. bath temperature with stirring. The mixture is then stirred for 5 hours at 80 to 90° C. and then worked up with chloroform. The evaporation residue is distilled in a high vacuum. There are obtained 2.7 grams of ethyl-2-methyl-3:5:6 - triallyl-D-glucofuranoside boiling at 125–135° C. under 0.02 mm. of pressure.

*Example 16*

9.8 grams of 1:2-isopropylidene-3:5:6-tribenzyl-D-glucofuranose are shaken for 1½ hours with 60 cc. of glycerine saturated with hydrogen chloride and 60 cc. of glacial acetic acid. The solution is then poured into ice water, extracted with chloroform, the chloroform extract evaporated under reduced pressure and the residue distilled in a high vacuum. There is obtained β:γ-dihydroxy-propyl - 3:5:6 - tribenzyl-D-glucofuranoside boiling at 260–280° C. under 0.03 mm. of pressure.

*Example 17*

3.28 grams of ethyl - 3:5:6-triallyl-D-glucofuranoside, 20 cc. of pyridine and 10 cc. of acetic anhydride are kept for 12 hours at room temperature. After working up from chloroform and distillation in a high vacuum there is obtained ethyl-2-acetyl-3:5:6-triallyl-D-glucofuranoside boiling at 150–155° C. under 0.04 mm. of pressure.

*Example 18*

2.5 grams of ethyl-3:5:6-trimethyl-D-glucofuranoside, 20 cc. of pyridine and 10 cc. of acetic anhydride are kept for 12 hours at room temperature. After working up from chloroform and distillation in a high vacuum there is obtained ethyl-2-acetyl-3:5:6-trimethyl-D-glucofuranoside boiling at 130–135° C. under 0.05 mm. of pressure.

*Example 19*

To 5 grams of ethyl-3:5:6-trimethyl-D-glucofuranoside there are added 20 cc. of N-sodium methylate solution. The solution is evaporated and the residue stirred for 12 hours at 70–80° C. with 4.95 grams of sodium monochloro-acetate, 0.8 gram of sodium hydroxide and 50 cc. of dioxane. The reaction mixture is dissolved in water and extracted with chloroform. The chloroform extract is washed with ice water, dried with sodium sulfate and evaporated under reduced pressure. The residue distills at 150–170° C. under 0.02 mm. of pressure. There is obtained ethyl - 2 - carboxymethyl - 3:5:6 - trimethyl - D-glucofuranoside.

*Example 20*

9.8 grams of 3:5:6-triallyl-1:2-isopropylidene-D-glucofuranose are shaken for 2 hours with 60 cc. of glycerine (saturated with hydrochloric acid gas) and with 60 cc. of glacial acetic acid. The reaction mixture is then worked up from chloroform as described in Example 16. There is obtained β:γ - dihydroxy-propyl-3:5:6-triallyl-D-glucofuranoside boiling at 200–220° C. under 0.05 mm. of pressure.

*Example 21*

5.6 grams of potassium hydroxide and 50 cc. of xylene are added to 5 grams of ethyl-3:5:6-trimethyl-D-glucofuranoside, and 7.2 grams of β-dimethylaminoethyl chloride hydrochloride are added in portions at 80–90° C. with stirring. After stirring for 12 hours at 80–90° C., the mixture is suction-filtered, evaporated under reduced pressure, and the residue distilled in a high vacuum. There is obtained ethyl-2-(β-dimethylamino-ethyl)-3:5:6-trimethyl-D-glucofuranoside boiling at 110–135° C. under 0.15 mm. of pressure. It can be converted into its salts, for example with hydrochloric acid, sulfuric acid, phos-

What is claimed is:
1. Ethyl-3:5:6-tribenzyl-D-glucofuranoside.
2. Methyl-3:5:6-tribenzoyl-D-glucofuranoside.
3. Ethyl-3:5:6-tribenzoyl-D-glucofuranoside.
4. Propyl-3:5:6-tribenzyl-D-glucofuranoside.
5. Ethyl-3:5:6-tribenzyl-2-acetyl-D-glucofuranoside.
6. 1:3:5:6-tetrabenzyl-D-glucofuranoside.
7. Hydroxyethyl-3:5:6-tribenzyl-D-glucofuranoside.
8. $\beta:\gamma$-dihydroxy-propyl-3:5:6-tribenzyl-D-glucofuranoside.
9. Ethyl-2-carboxymethyl-3:5:6-trimethyl-D-glucofuranoside.
10. A glucofuranoside of the formula:

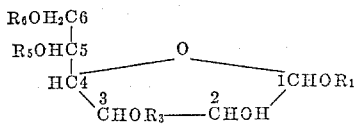

in which $R_1$ represents a radical selected from the group consisting of $-(CH_2)_n-H$, $n$ being at least 2, lower alkenyl and lower alkinyl and such radicals substituted by at least one member selected from the group consisting of amino, hydroxy, mercapto, lower mono- and di-alkyl-, alkenyl-, cycloalkyl-, cycloalkenylamino, alkylene-imino, mono-aza-lower alkyleneimino, mono-oxa-lower alkylene-imino, lower alkoxy, lower alkylmercapto, carboxy, carbalkoxy, carbamyl, cyano, and halogen groups; cycloalkyl, lower alkyl-cycloalkyl, cycloalkenyl, lower alkyl-cycloalkenyl; cycloalkyl-lower alkyl, cycloalkenyl-lower alkyl; phenyl-, lower alkoxyphenyl-, halogenphenyl-, lower alkylphenyl-, trifluoromethylphenyl-lower alkyl; phenyl, lower alkoxyphenyl, halogenphenyl, lower alkylphenyl, trifluoromethylphenyl; thienyl-, furyl- and pridyl-methyl; and each of the radicals $R_3$, $R_5$ and $R_6$ stands for a member selected from the group consisting of $R_1$, $n$ being at least 1, and of acyl radicals selected from the group consisting of those of benzene-, lower alkoxy-benzene-, lower alkylbenzene, trifluoromethylbenzene-, halogenobenzene-, pyridine, thiophene, furan-, pyrrole-, pyrazole-, pyridazine-, pyrazine- and pyrimidine-carboxylic acids.

11. A compound as claimed in claim 10, which are O-substituted in 2-position by a member selected from the group consisting of aliphatic, alicyclic, araliphatic and heterocyclyl-aliphatic radicals selected from the group consisting of $-(CH_2)_n-H$, $n$ being at least 1, lower alkenyl and lower alkinyl and such radicals substituted by at least one member selected from the group consisting of amino, hydroxy, mercapto, lower mono- and di-alkyl-, alkenyl-, cycloalkyl-, cycloalkenylamino, alkylene-imino, mono-aza-lower alkyleneimino, mono-oxa-lower alkylene-imino, lower alkoxy, lower alkylmercapto, carboxy, carbalkoxy, carbamyl, cyano, and halogen groups; cycloalkyl, lower alkyl-cycloalkyl, cycloalkenyl, lower alkyl-cycloalkenyl; cycloalkyl-lower alkyl, cycloalkenyl-lower alkyl; phenyl-, lower alkoxyphenyl-, halogenphenyl-, lower alkylphenyl-, trifluoromethylphenyl-lower alkyl; phenyl, lower alkoxyphenyl, halogenphenyl, lower alkylphenyl, trifluoromethylphenyl; thienyl-, furyl- and pyridyl-methyl, and the acyl radical selected from the group consisting of those of fatty acids, cycloalkyl-fatty acids, phenyl-, lower alkoxy-phenyl-, lower alkyl-phenyl-, trifluoromethylphenyl-, and halogenphenyl-fatty acids and benzene- and toluenesulfonic acids.

12. A glucofuranoside of the formula:

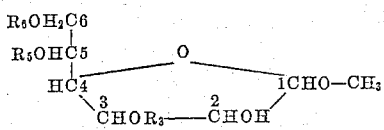

in which each of the radicals $R_3$, $R_5$ and $R_6$ stands for a member selected from the group consisting of $R_1$, and of acyl radicals selected from the group consisting of those of benzene-, lower alkoxy-benzene-, lower alkylbenzene, trifluoromethylbenzene-, halogeno-benzene, pyridine-, thiophene, furan-, pyrrole-, pyrazole-, pyridazine-, pyrazine- and pyrimidine-carboxylic acids and at least one of the radicals $R_3$, $R_5$ and $R_6$ represents one of the said acyl radicals, $R_1$ being selected from the group consisting of $-(CH_2)_n-H$, $n$ being at least 1, lower alkenyl and lower alkinyl and such radicals substituted by at least one member selected from the group consisting of amino, hydroxy, mercapto, lower mono- and di-alkyl-, alkenyl-, cycloalkyl-, cycloalkenylamino, alkylene-imino, mono-aza-lower alkyleneimino, mono-oxa-lower alkylene-imino, lower alkoxy, lower alkylmercapto, carboxy, carbalkoxy, carbamyl, cyano, and halogen groups; cycloalkyl, lower alkyl-cycloalkyl, cycloalkenyl, lower alkyl-cycloalkenyl; cycloalkyl-lower alkyl, cycloalkenyl-lower alkyl; phenyl-, lower alkoxyphenyl-, halogenphenyl-, lower alkylphenyl-, trifluoromethylphenyl-lower alkyl; phenyl, lower alkoxyphenyl, halogenphenyl, lower alkylphenyl, trifluoromethylphenyl; thienyl-, furyl- and pyridyl-methyl.

13. A compound as claimed in claim 12, which are O-substituted in 2-position by a member selected from the group consisting of $R_1$, and the acyl radical selected from the group consisting of those of fatty acids, cycloalkyl-fatty acids, cycloalkyl-fatty acids, phenyl-, lower alkoxy-phenyl-, lower alkylphenyl-, trifluoromethylphenyl-, and halogenophenyl-fatty acids and benzene- and toluenesulfonic acids, $R_1$ being selected from the group consisting of $-(CH_2)_n-H$, $n$ being at least 1, lower alkenyl and lower alkinyl and such radicals substituted by at least one member selected from the group consisting of amino, hydroxy, mercapto, lower mono- and di-alkyl-, alkenyl-, cycloalkyl-, cycloalkenylamino, alkylene-imino, mono-aza-lower alkyleneimino, mono-oxa-lower alkylene-imino, lower alkoxy, lower alkylmercapto, carboxy, carbalkoxy, carbamyl, cyano, and halogen groups; cycloalkyl, lower alkyl-cycloalkyl, cycloalkenyl, lower alkyl-cycloalkenyl; cycloalkyl-lower alkyl, cycloalkenyl-lower alkyl; phenyl-, lower alkoxyphenyl-, halogenphenyl-, lower alkylphenyl-, trifluoromethylphenyl-lower alkyl; phenyl, lower alkoxyphenyl, halogenphenyl, lower alkylphenyl, trifluoromethylphenyl; thienyl- furyl- and pyridyl-methyl.

14. A glucofuranoside of the formula:

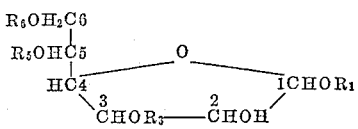

wherein $R_1$ stands for lower alkyl having at least two carbon atoms and each of the radicals $R_3$, $R_5$ and $R_6$ represents lower alkyl.

15. A glucofuranoside of the formula:

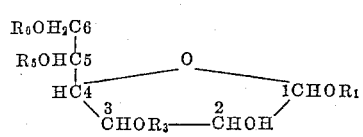

wherein $R_1$ stands for lower alkenyl and each of the radicals $R_3$, $R_5$ and $R_6$ represents lower alkyl.

16. A glucofuranoside of the formula:

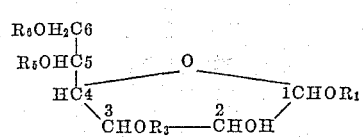

wherein $R_1$ stands for lower alkyl having at least two carbon atoms and each of the radicals $R_3$, $R_5$ and $R_6$ for benzyl.

17. A glucofuranoside of the formula:

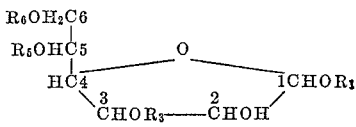

wherein $R_1$ stands for lower alkyl having at least two carbon atoms and each of the radicals $R_3$, $R_5$ and $R_6$ for benzoyl.

18. A glucofuranoside of the formula:

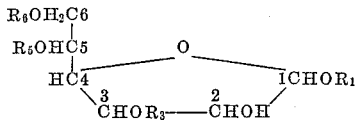

wherein $R_1$ stands for lower alkenyl and each of the radicals $R_3$, $R_5$ and $R_6$ for benzyl.

19. A glucofuranoside of the formula:

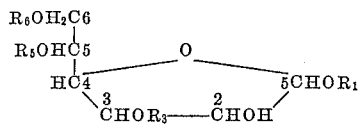

wherein $R_1$ stands for lower alkenyl and each of the radicals $R_3$, $R_5$ and $R_6$ for benzoyl.

20. A glucofuranoside of the formula:

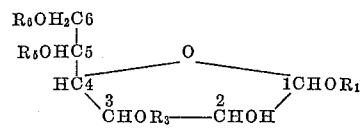

wherein $R_1$ stands for cycloalkyl and each of the radicals $R_3$, $R_5$ and $R_6$ for benzyl.

21. A glucofuranoside of the formula:

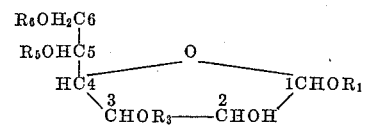

wherein $R_1$ stands for cycloalkyl and each of the radicals $R_3$, $R_5$ and $R_6$ for benzoyl.

22. A glucofuranoside of the formula:

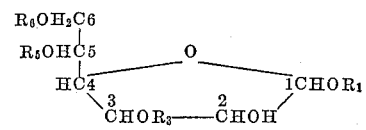

wherein $R_1$ stands for benzyl and each of the radicals $R_3$, $R_5$ and $R_6$ for benzyl.

23. A glucofuranoside of the formula:

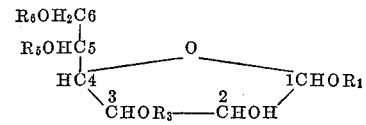

wherein $R_1$ stands for benzyl and each of the radicals $R_3$, $R_5$ and $R_6$ for benzoyl.

24. A glucofuranoside of the formula:

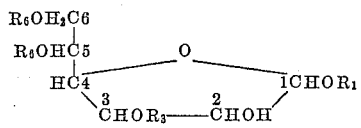

wherein $R_1$ stands for lower alkyl having at least one hydroxy group and each of the radicals $R_3$, $R_5$ and $R_6$ stands for benzyl.

25. A glucofuranoside of the formula:

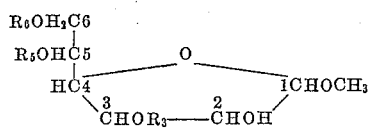

wherein $R_3$, $R_5$ and $R_6$ each stands for benzoyl.

26. A pharmaceutical composition comprising an effective amount of a glucofuranoside of the formula:

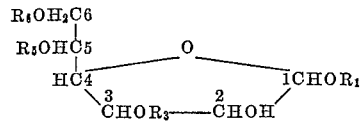

in which $R_1$ represents radical selected from the group consisting of lower alkyl, lower alkenyl and lower alkinyl and such radicals substituted by at least one member selected from the group consisting of amino, hydroxy, mercapto, lower mono and di-alkyl-, alkenyl-, cycloalkyl-, cycloalkenylamino; alkyleneimino, mono-aza-lower alkylene-imino, mono-oxa-lower alkyleneimino, lower alkoxy, lower alkyl-mercapto, carboxy, carbalkoxy, carbamyl, cyano, and halogen groups; cycloalkyl, lower alkyl-cycloalkyl, cycloalkenyl, lower alkyl-cycloalkenyl; cycloalkyl-lower alkyl, cycloalkenyl-lower alkyl; phenyl-, lower alkoxyphenyl-, halogenphenyl-, lower alkyl-phenyl-, trifluoromethylphenyl-lower alkyl; phenyl, lower alkoxyphenyl, halogenphenyl, lower alkylphenyl, trifluoromethylphenyl; thienyl, furyl- and pyridyl-methyl; and each of the radicals $R_3$, $R_5$ and $R_6$ stands for a member selected from the group consisting of $R_1$ and acyl radicals of benzene-, lower alkoxy-benzene-, lower alkyl-benzene, trifluoromethyl-benzene-, halogeno-benzene-, pyridine-, thiophene, furan-, pyrrole-, pyrazole-, pyridazine-, pyrazine- and pyrimidine-carboxylic acids, together with a pharmaceutical carrier.

References Cited in the file of this patent

Reeves et al.: J. Am. Chem. Soc., 76 (1954), pages 2219–21.
Bishop et al.: Can. J. Chem., 34 (1956), pages 845–50, cited in Chem. Abst. 51, 2573a (1957).
Shyluk et al.: Can. J. Chem., 34 (1956), pages 575–582, cited in Chem. Abst., 51, 4287b (1957).

UNITED STATES PATENT OFFICE
CERTIFICATE OF CORRECTION

Patent No. 3,157,634                                November 17, 1964

Jean Druey et al.

It is hereby certified that error appears in the above numbered patent requiring correction and that the said Letters Patent should read as corrected below.

Column 2, line 9, for "3," read -- 3-, --; line 32, for "of" read -- or --; column 3, line 39, for "carriers" read -- carrier -- column 4, line 22, for "310-310° C." read -- 310-330° C. --; line 43, for "280-290° C.," read -- 280-290° C. --; line 54, for "-tribenzyl-pD-" read -- -tribenzyl-D- --; column 5, line 18, for "3:5:5-" read -- 3:5:6- --; line 45, for "0.66 mm." read -- 0.06 mm --; column 8, line 43, for "thienyl-" read -- thienyl-, --; column 10, lines 2 to 8, for that portion of the formula reading

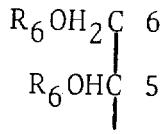      read      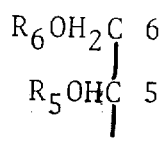

line 32, for "radical" read -- a radical --; line 46, for "thienyl," read -- thienyl-, --; same column 10, line 48, for "acyl" read -- of acyl --.

Signed and sealed this 12th day of October 1965.

(SEAL)
Attest:

ERNEST W. SWIDER                          EDWARD J. BRENNER
Attesting Officer                      Commissioner of Patents